United States Patent [19]

Lehman et al.

[11] Patent Number: 4,774,390

[45] Date of Patent: Sep. 27, 1988

[54] HAND PROTECTOR APPARATUS FOR ELECTRICAL APPARATUS

[75] Inventors: Lewis M. Lehman, Brown Deer; Thomas F. Kurland, Cedarburg, both of Wis.

[73] Assignee: Square D Company, Palatine, Ill.

[21] Appl. No.: 142,303

[22] Filed: Dec. 29, 1987

Related U.S. Application Data

[63] Continuation of Ser. No. 8,092, Jan. 21, 1987, abandoned, which is a continuation of Ser. No. 721,988, Apr. 9, 1985, abandoned.

[51] Int. Cl.$^4$ .............................................. H01H 9/02
[52] U.S. Cl. ................................ 200/304; 174/138 F; 200/305
[58] Field of Search ............ 200/304, 305; 339/44 M, 339/198 J; 174/59, 60, 138 F, 5 R; 220/3.8, 3.94, 356

[56] References Cited

U.S. PATENT DOCUMENTS

| Re. 30,435 | 11/1980 | Fukao | 200/307 |
|---|---|---|---|
| 3,467,768 | 9/1969 | Shorey | 174/138 F |
| 3,564,485 | 2/1971 | Cull et al. | 339/198 J |
| 3,683,314 | 8/1972 | Elkins | 174/138 F |
| 3,690,501 | 9/1972 | Ware | 220/3.94 |
| 4,027,279 | 5/1977 | Shigehara | 336/90 |
| 4,045,112 | 8/1977 | Rodondi et al. | 339/99 R |
| 4,195,194 | 3/1980 | Kuster et al. | 174/59 |
| 4,415,044 | 11/1983 | Davis | 174/138 F |
| 4,423,465 | 12/1983 | Teng-Ching et al. | 200/307 |

FOREIGN PATENT DOCUMENTS

| 595916 | 10/1925 | France | 174/5 R |
|---|---|---|---|
| 7322776 | 1/1975 | France | 174/138 F |

Primary Examiner—Renee S. Luebke
Attorney, Agent, or Firm—A. Sidney Johnston; Richard T. Guttman

[57] ABSTRACT

The invention is an electrical shock prevention apparatus for electrical equipment having conductors capable of being connected to a voltage source comprising, a shield made of nonconductive material and guarding the conductors on at least three sides, and a cover attached to the shield by a living hinge so that when the cover is closed, the conductors are not accessible from a fourth side, and when the cover is open, the conductors are accessible from the fourth side. The invention also has rails molded into the side of the electrical apparatus, and grooves molded into a side of the shield so that the shield is attached to the apparatus by the grooves sliding over the rails. Protrusions extending from the side of the electrical apparatus snap into a recess of the shield, thereby locking the shield into position on the rails.

16 Claims, 5 Drawing Sheets

HAND PROTECTOR APPARATUS FOR ELECTRICAL APPARATUS

This is a continuation of application Ser. No. 008,092 filed Jan. 21, 1987 which is a continuation of application Ser. No. 721,988 filed on Apr. 9, 1985 both now abandoned.

FIELD OF THE INVENTION

This invention relates to protective shields for electrical apparatus for preventing electric shock to workmen, and more particularly to protective shields for terminals of electrical apparatus mounted on an electric panel.

BACKGROUND OF THE INVENTION

Various protective devices have been suggested for protecting the terminals of an electrical device from accidentally causing shock to a person who inadvertantly touches the exposed terminals. For example, a snap on type of protector is shown in U.S. Pat. No. 4,027,279, issued to Shigehara on May 31, 1977. Another such protective shield for a terminal block is shown in U.S. Pat. No. 3,564,485, issued to Cull, et al. on Feb. 16, 1971. A still different type of terminal shield is shown in U.S. Pat. No. 3,467,768, issued to Shorey on Sept. 16, 1969. A still further type of terminal protection device is shown in U.S. Pat. No. 4,415,044, issued to Davis on Nov. 15, 1983.

A disadvantage of terminal protectors of the prior art, as for example the disclosures of the above-mentioned United States patents, is that the terminal protectors do not provide easy access to the terminals once the protectors are installed. In many instances, the terminal protector must be physically removed from the electrical terminals which it protects in order for a technician to service the terminals, and this aspect is disadvantageous because of the tendancy of technicians to discard the terminal protector once it is removed. A technician may discard the terminal protector in order to gain easier access on subsequent service operations to the terminals.

Thus, a long standing problem in safety design of terminal protective shields has been to provide a shield which both prevents accidental contact by a person with terminals having high voltage applied thereto, and at the same time providing easy access to the terminals so that a technician may, for example, check the voltage applied to the terminals during trouble shooting operations, check the torque of bolts holding wires to the terminals, and perform other routine maintenance service operations to the terminals.

SUMMARY OF THE INVENTION

The invention provides a simple and inexpensive terminal protective shield for preventing accidental electrical shock by a person coming in contact with the terminals, while at the same time providing easy access for a technician to service the terminals.

The invention is an electrical shock prevention apparatus for electrical equipment having conductors capable of being connected to a voltage source comprising, a shield made of nonconductive material and guarding the conductors on at least three sides, and a cover attached to the shield by a living hinge so that when the cover is closed, the conductors are not accessible from a fourth side, and when the cover is open, the conductors are accessible from the fourth side.

The invention also has rails molded into the side of the electrical apparatus, and grooves molded into a side of the shield so that the shield is attached to the apparatus by the grooves sliding over the rails. Protrusions extending from the side of the electrical apparatus snap into a recess of the shield, thereby locking the shield into position on the rails.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

United States patent applications related to the present application and assigned to the assignee of this application include the following: IC-644 for "Auxiliary Electrical Contact for Electromagnetic Contactor", inventors L. M. Lehman, et al, Ser. No. 721,986; IC-645 for "Mounting Apparatus for Arc Quenching Plates for Electric Contacts", inventor L. M. Lehman, Ser. No. 721,984, now issued as U.S. Pat. No. 4,684,722; IC-646 for "Terminal Structure for a Coil", inventors J. Schmiedel, et al, Ser. No. 721,983, now issued as U.S. Pat. No. 4,705,341; IC-652 for "Coil Apparatus for Electromagnetic Contactor", inventors J. Schmiedel, et al, Serial No. 721,985", now issued as U.S. Pat. No. 4,647,886, all disclosures of which are incorporated herein by reference.

Figure 1:
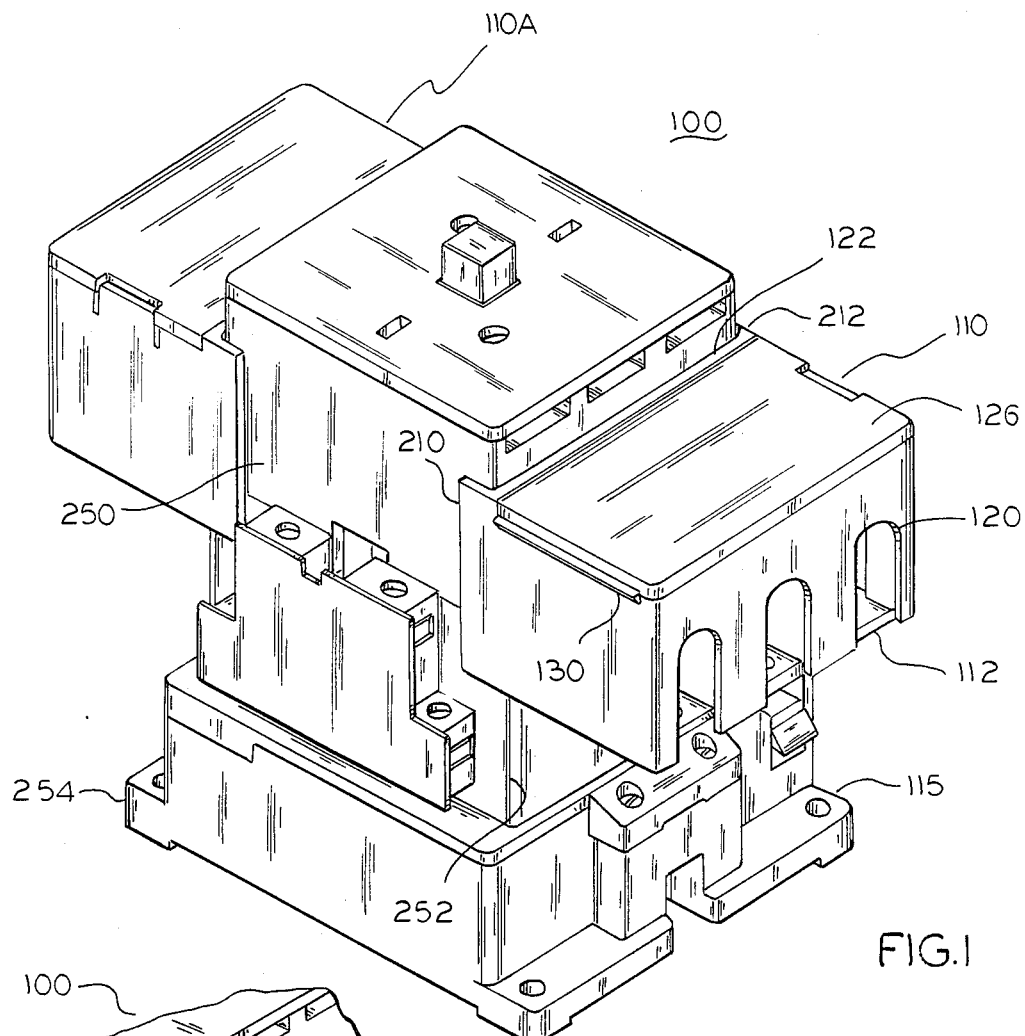
FIG. 1 is a perspective drawing with protector shields at two locations on a contactor.

FIG. 1 shows the exterior of an electric contactor 100 having a protective shield 110 mounted to reduce electrical shock hazard presented by conductors 112. Contactor 100 may be mounted, for example to the rear wall of a cabinet or rack (not shown), by passing bolts through holes 115. Shield 110A provides protection for conductors on a second side of contactor 100.

Figure 2:
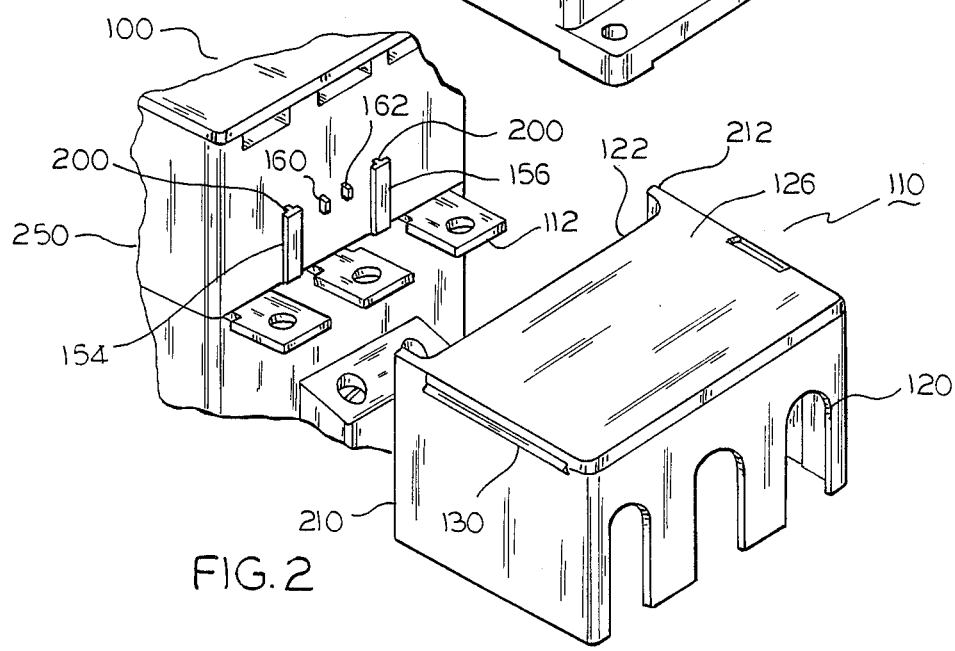
FIG. 2 is an exploded perspective view taken from FIG. 1.
Figure 3:
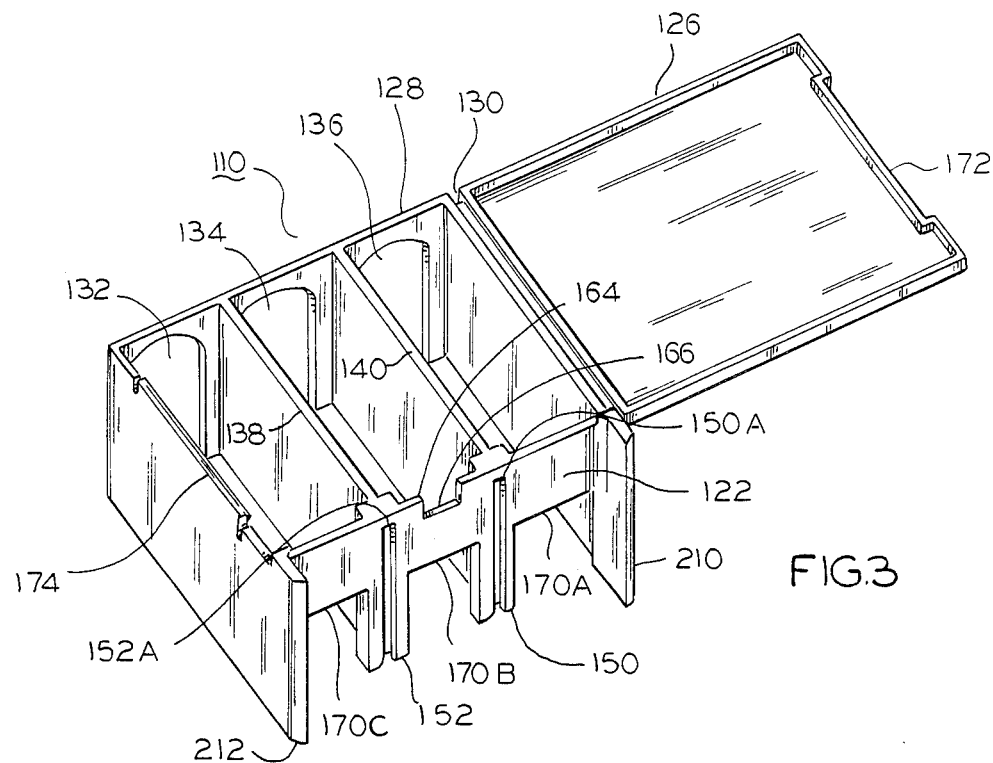
FIG. 3 is a perspective view of a shield with the cover open.

FIG. 2 is an exploded view showing contactor 100, shield 110, and conductors 112. Conductors 112 may be, for example, copper strips which attach to the fixed poles of a contactor. Three conductors 112 such as are shown in FIG. 2 are appropriate for use in a three phase alternating current circuit. Contactor 100 could be used, for example, for controlling a three phase alternating current motor. Shield 110 provides electrical shock protection for conductors 112. When contactor 100 is mounted in an enclosure, insulated wires (not shown) are attached to conductors 112 by passing through openings 120 of shield 110. Only insulated portions of the wires extend beyond the openings 120. Shield 110 is a safety device which prevents a person from accidentally touching conductors 112 and receiving an electric shock therefrom. FIG. 3 is a view of shield 110, in perspective, and viewed from end 122 which abuts contactor 100. Cover 126 of shield 110 is shown open in FIG. 3.

Figure 5:
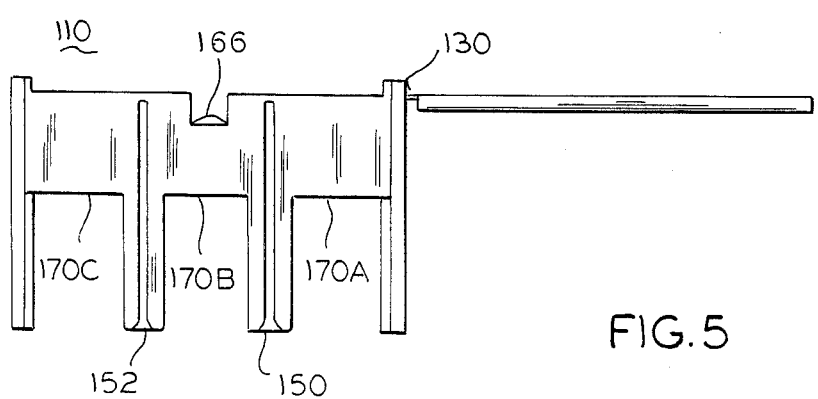
FIG. 5 is a side view of a shield with the cover open.
Figure 11:
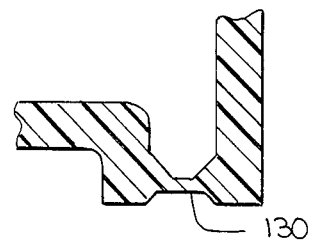
FIG. 11 is an enlarged view of a "living hinge" molded to attach the cover to the shield.

Cover 126 is connected to body 128 of shield 110 by a living hinge 130. For example, shield 110 may be molded from polyethylene, and living hinge 130 may be molded as a very thin section of polyethylene. Such a thin molded hinge is well-known in the art of polyethylene molding. A further detail of hinge 130 is shown in FIG. 5, which is a side view of shield 110 taken from end 122. A further detail of hinge 130 is shown in FIG. 11, which is an enlarged view of the hinge in cross-section.

Figure 4:
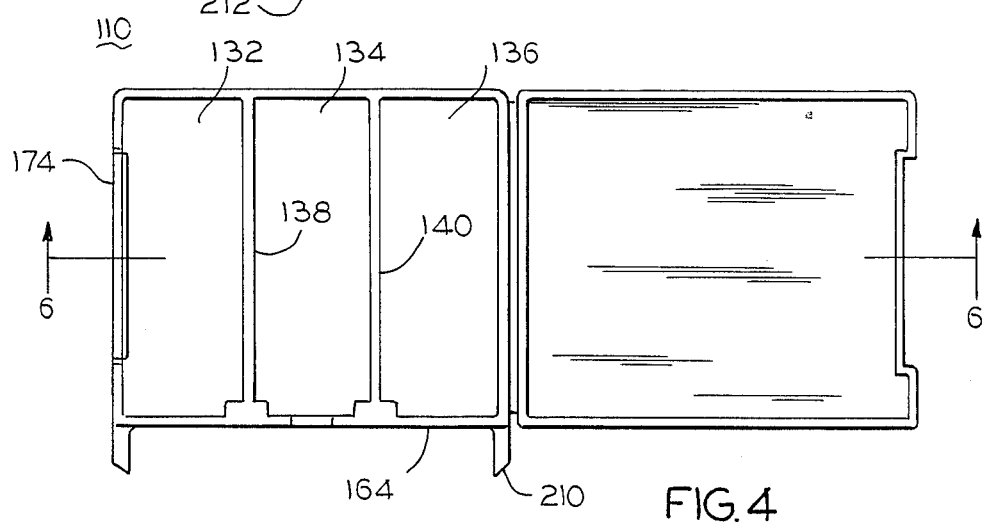
FIG. 4 is a top view of a shield with the cover open.

FIG. 4 is a top view of shield 110. Chambers 132, 134, and 136 are shown in both FIGS. 3 and 4. Walls 138 and 140 form chambers 132, 134, 136. Chambers 132, 134, and 136 provide independent protection for each of the three conductors 112 designed for three-phase alternating current use. Walls 138 and 140 prevent arcing between the phases of conductors 112.

Shield 110 attaches to contactor 100 by grooves 150 and 152 in shield 110, as shown in FIG. 3, sliding over rails 154 and 156 molded into the body of contactor 100. The body of contactor 100 may be made, for example, of a molded plastic material. Rails 154 and 156 are, for example, molded extensions of the plastic molding comprising the body of contactor 100. Protrusions 160, 162 are molded extensions of the body of contactor 100. As grooves 150, 152 slide along rails 154, 156, the rear wall 164 of shield 110 deflects, thereby permitting the passage of rear wall 164 by protrusions 160, 162. When shield 110 reaches an appropriate position, protrusions 160, 162 snap into cut away 166, shown in FIG. 3 and FIG. 5, of shield 110, thereby locking shield 110 into position on rails 154, 156. Shield 110 cannot move too far along rails 154, 156 because ends 150A and 152A of slots 150, 152 catch against the ends of ribs 154, 156. Also conductors 112 may catch against edges 170a, 170b and 170c of shield 110.

Figure 6:
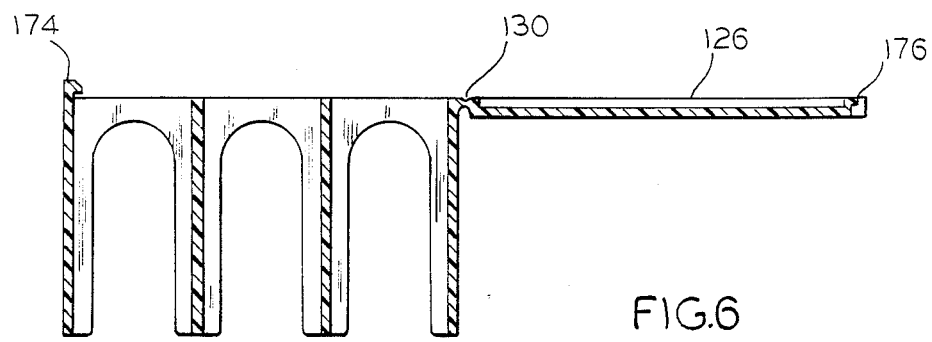
FIG. 6 is a cross-section of the shield taken at line 6 shown in FIG. 4.

As cover 126 of shield 110 is closed, edge 172 of cover 126 presses against catch 174 molded into the side of shield 110 opposite to the side having hinge 130. The pressure of edge 172 causes deflection of catch 174, and allows cover 126 to be closed to the point that catch 174 snaps over cover 126, thereby latching cover 126 into the closed position. FIG. 6 shows catch 174 and cover 126 in the open position. FIG. 6 also shows tab 176 of cover 126 which fits under flap 174. FIG. 6 is a cross-sectional view of shield 110 as taken along line 6 shown in FIG. 4.

Figure 7:
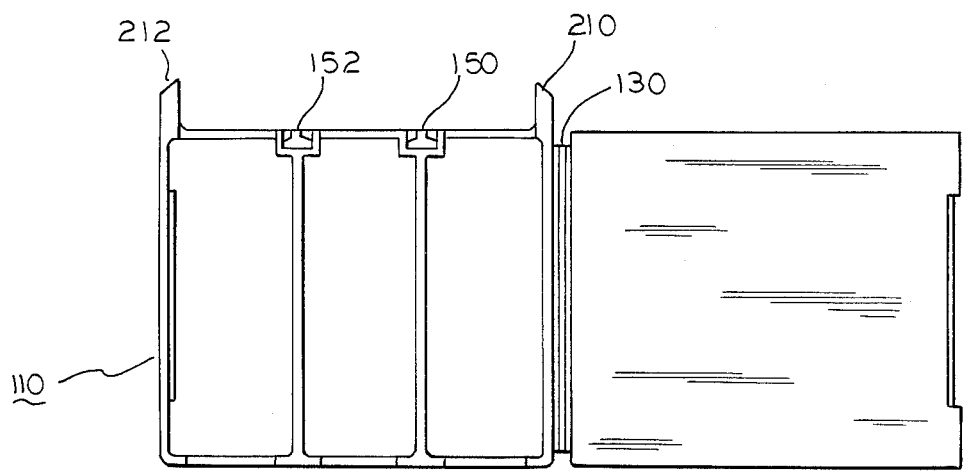
FIG. 7 is a bottom view of a shield with the cover open.
Figure 8:
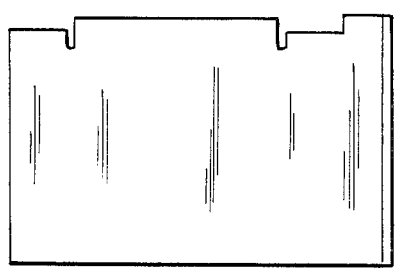
FIG. 8 is a side view of the shield.
Figure 9:
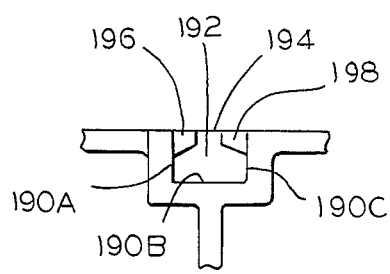
FIG. 9 is an enlarged view of a groove molded into a shield for attachment to rails.

FIG. 7 is a bottom view of shield 110 and shows grooves 150, 152 at their bottom end for matingly sliding over rails 154, 156. FIG. 9 shows an enlarged view of either groove 150 or groove 152. The groove is formed by molded material, for example, polyethylene, forming three walls 190a, 190b, and 190c. The fourth side 192 of the groove has an opening 194, and small projections 196 and 198 on either side of opening 194. The grooves, have three solid walls and an open wall, and the open wall provides clearance for the vertical part 200 of rails 154, 156 as the groove slides over the rail.

Figure 10:
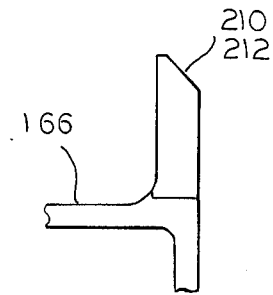
FIG. 10 is an enlarged view of side arms of a shield for fitting to a contactor.

Guides 210, 212 provide stability for shield 110 in its attachment to contactor 100 by gripping the sides of contactor 100 as shown in FIG. 1. FIG. 10 shows a detail of the construction of guides 210 or 212. The guides 210, 212 may be molded in the single piece molding by which shield 110 may be made.

Figure 12:
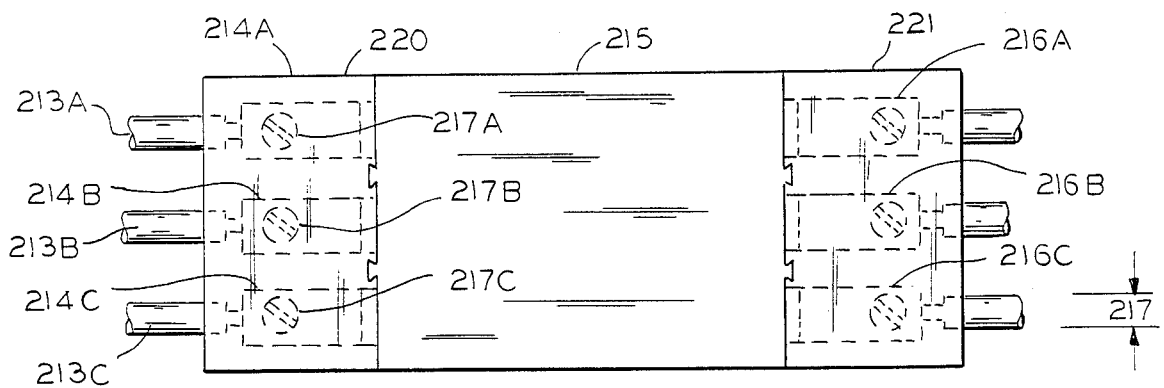
FIG. 12 is a top view of a contactor having two shields attached thereto.

FIG. 12 shows a top view of an electrical apparatus having three conductors 214a, 214b, 214c mounted on a first side, and three conductors 216a, 216b, 216c mounted on a second side. The electrical apparatus 215 may be, for example, a contactor in which a contact between conductor 214a and 216a is established by energization of an electromagnet which pulls a contact bar into position to establish that contact. Similarly contact 214b may be connected electrically to contact 216b, and contact 214c may be connected electrically to contact 216c by energization of the electromagnet. Shield 220 and shield 221 are shown in place to protect conductors 214a, 214b, 214c and 216a, 216b, 216c, respectively, from accidental contact by a person. Also shown in FIG. 12 are bolt connections for attaching wires 213a, 213b, 213c, to their respective conductors. Wires also are shown connected to conductors 216a, 216b, and 216c by bolts. When cover 126 of shield 220 is closed, the conductors are protected from accidental contact by a person. When cover 126 is open, bolts 217a, 217b, 217c are accessible from the face of the electrical equipment 215 so that they may be serviced by a technician. For example, the bolts could be tightened to the appropriate torque by the technician. This adjustment, is of course, made when the electric voltage is disconnected from the respective conductors. When cover 126 of shield 221 is opened, the bolts attaching wires to conductors 216a, 216b, 216c are exposed for easy access by a technician. When cover 126 is closed on shield 221, the conductors are protected from accidental contact by a person. The wires are insulated as shown by diameter 217 exterior to shield 220, 221, and are bare for their connection to the conductors by the bolts. The rails of this embodiment show the alternative use of a triangular shape.

Figure 13:
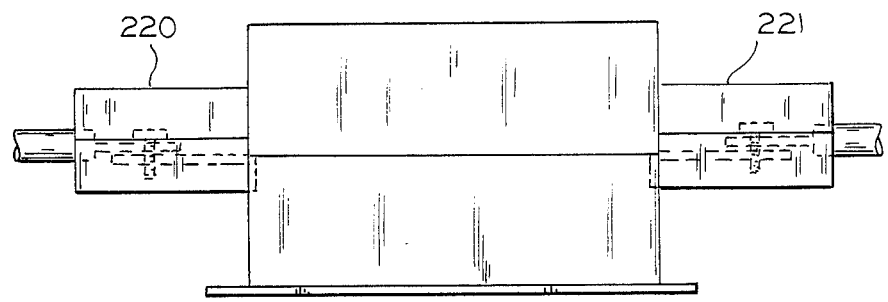
FIG. 13 is a side view of a contactor having two shields attached thereto.
Figure 15:
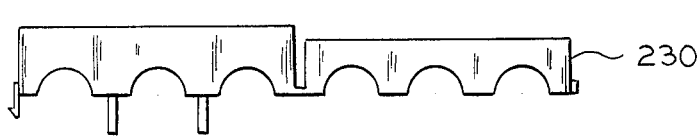
FIG. 15 is an end view of a shield.
Figure 14:
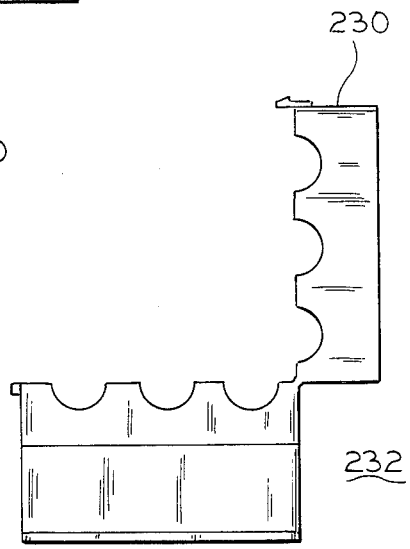
FIG. 14 is an end view of a shield.
Figure 16:
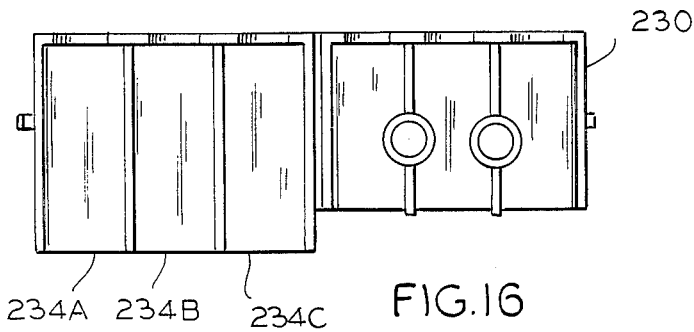
FIG. 16 is a top view of a shield.
Figure 17:
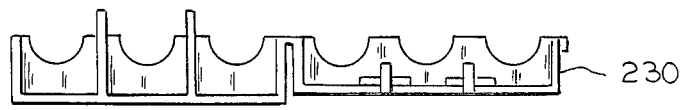
FIG. 17 is an end view of a shield.

FIG. 13 is a side view of the apparatus of FIG. 12 showing bolt connections of wires to the conductors of the apparatus, and each set of conductors being protected by shield 220 or shield 221, respectively, FIG. 14, FIG. 15, FIG. 16, and FIG. 17 show an alternative embodiment of shield 10. FIGS. 14, 15, 16 and 17 show an embodiment of a shield having molded circular openings which surround the wires (not shown) attaching to the conductors. By having molded openings surround the insulated portions of the wires even greater safety against shock hazard is achieved. FIG. 14 is an end view showing the cover 230 of shield 232 in an open position. FIG. 15, FIG. 16, and FIG. 17, also show cover 230 in an open position. FIG. 16 particularly shows three chambers 234a, 234b and 234c for individually protecting the three conductors of a three phase alternating current system.

Contactor 100 may be made in three sections 250, 252, and 254, as shown in FIG. 1. Section 254 is a base section, section 252 is a middle section, and section 250 is a top section. Rails 154, 156 are shown made into the exterior of top section 250, as shown in FIG. 2. In an embodiment of the invention having rails 154, 156 made into top section 250 shield 110 may be inserted upon the rails after contactor 100 is assembled, and particularly after conductors 112 are assembled into contactor 100. Also, shield 110 may be removed from rails 154, 156 without any need to disturb conductors 112.

Figure 18:
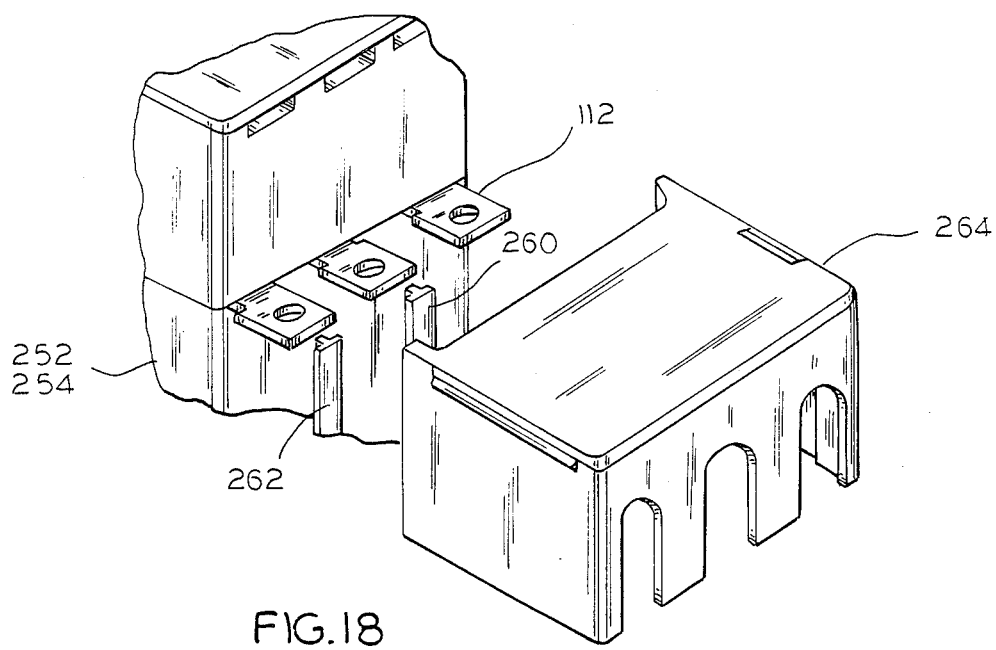
FIG. 18 is an exploded perspective of an alternate embodiment of the invention.
Figure 19:
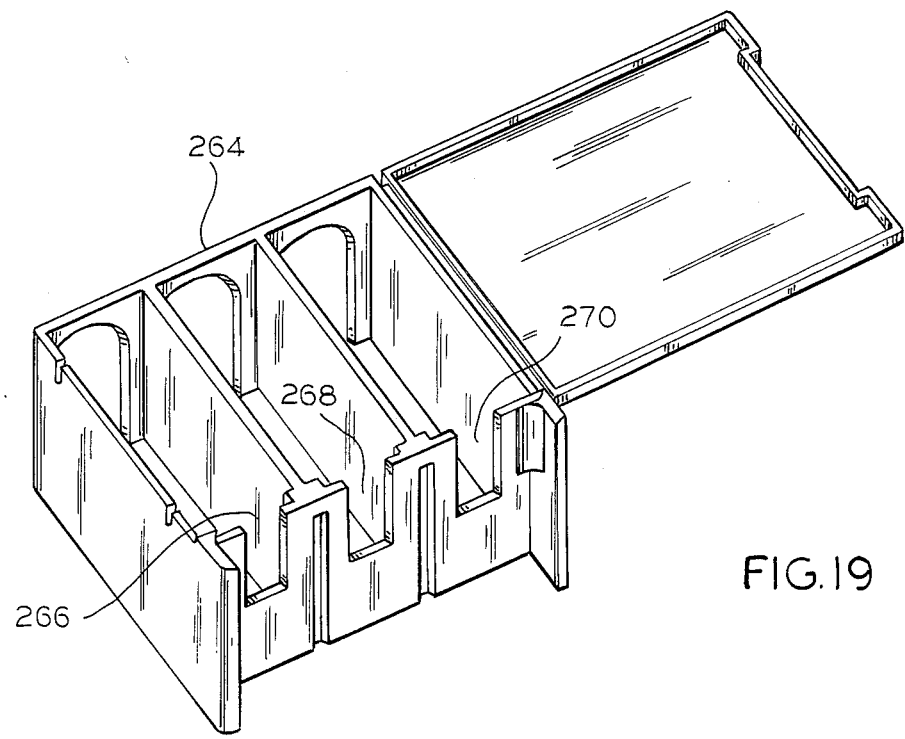
FIG. 19 is a perspective view showing an alternate embodiment of the invention.

In an alternative embodiment shown in FIG. 18 and FIG. 19, rails 260 and 262 may be made into middle housing 252 or lower housing 254. When rails 260, 262 are made into middle housing 252 or lower housing 254, then conductors 112 block removal of shield 110 from the contactor. That is, the contactor must be dissassembled and conductors 112 dissasembled from the housing parts in order to remove shield 110 from rails 154, 156 in this alternative embodiment of the invention. An advantage to this alternative embodiment is that shield 110 may not inadvertantly be removed from the contactor by a technician in order to improve access to conductors 112, and thereby defeat the purpose of the shield 110. The inability to remove shield 110 from contactor 100 is an advantage in the situation in which it is necessary to prevent the easy removal of the shield. FIG. 19 shows shield 264 having openings 266, 268, 270 made to fit over conductors 112 when shield 264 is attached to rails on housing 252 or 254, as shown in FIG. 18. It is to be understood that the invention is applicable to a wide variety of electrical apparatus such as, but not limited to, relays, timers, circuit breakers, bus bars, and any other equipment having potentially exposed electrical conductors. The embodiments of the invention set forth herein show the invention used with an electrical contactor as a convenient means of illustrating the use of the invention. The described embodiments are merely convenient examples of the invention and do not in any way limit the use of the invention for a wide variety of electrical apparatus.

Parts for contactors may be made out of a variety of plastic materials. For example, for a contactor rated to control a 132 kilowatt motor at 380 volts, three phase alternating current, the following materials have been found to be suitable for the various parts: the upper housing, the middle housing, and the contact carrier may be made from glass reinforced thermoset polyester; and the lower housing may be made of glass reinforced polycarbonate. For contactors designed to control up to 75 kilowatt motors at 380 volts, three phase alternating current, the same materials as used for the 132 kilowatt device have been found to be suitable. For contactors designed to control 37 kilowatt motors of 380 volts three phase alternating current it has been found suitable to use the following materials: for the middle and upper housing, glass reinforced thermoset polyester; for the contact carrier, glass reinforced polyphenylene sulfide; and for the lower housing glass reinforced polycarbonate. For a contactor designed to control a 22 kilowatt motor it has been found suitable to use the following materials, for both an upper and a lower housing, glass reinforced polycarbonate, and contactors of this size may have no middle housing, and further, the carrier may be made of glass reinforced thermoset polyester. Materials referred to herein as rubber, for example, rubber supports or rubber mats, may suitably be made from ethylene acrylic. A finger protector has been found useful on these devices, and a finger protector may be made of polypropylene.

It is to be understood that the above-described embodiments are simply illustrative of the principles of the invention. Various other modifications and changes may be made by those skilled in the art which will embody the principles of the invention and fall within the spirit and scope thereof.

We claim:

1. An electrical shock prevention apparatus for electrical equipment having conductors capable of being connected to a voltage source, comprising:
   a shield made of nonconductive material and guarding said conductors on at least three sides;
   a cover attached to said shield by a living hinge so that when said cover is closed said conductors are not accessible from a fourth side, and when said cover is open said conductors are accessible from said fourth side;
   at least one rail extending from at least one side of said electrical equipment;
   at least one groove made into said shield, said groove having an internal cross section for interlocking with said rail, so that said shield may be attached to said electrical equipment by sliding said at least one groove over said at least one rail; and,
   at least one protrusion extending from at least one side of said electrical equipment and capable of locking against said shield as said shield slides along said at least one rail in order to lock said shield in place on said at least one rail thereby preventing said shield from sliding off of said at least one rail.

2. The apparatus as in claim 1 wherein said electrical equipment is a contactor.

3. The apparatus as in claim 1 wherein said shield is made of polyethylene and said living hinge is a thinned section of polyethylene molded to permit said thin section to bend as a hinge.

4. The apparatus as in claim 1 further comprising a plurality of said shields attached to said electrical equipment.

5. The apparatus as in claim 1 wherein said shield further comprises three separate chambers for providing individual protection for each of three conductors for three phase alternating current.

6. The apparatus as in claim 1 wherein said at least one groove made into said shield further comprises:
   a molded elongated chamber having three enclosed sides and an opening in a fourth side to permit passage of said at least one rail.

7. The apparatus as in claim 1 further comprising openings made into a first side of said at least three sides in order to permit passage of electrical wiring to said conductors.

8. The apparatus as in claim 1 further comprising:
   at least one molded recess in a one of said at least three sides of said shield and a matching molded recess in said cover so that an opening is formed between said matching molded recesses when said cover is closed thereby permitting a wire to pass through said opening in order to connect to said conductors.

9. An apparatus as in claim 1 wherein said electrical equipment is a contactor having a base section, a middle section and an upper section, and said shield attaches to said upper section by said at least one groove molded into said shield slidably attaching to said at least one rail protruding from said upper section, so that said shield may be slidably engaged with said at least one rail after said contactor is fully assembled, and also may be removed from said at least one rail after said contactor is fully assembled.

10. The apparatus as in claim 1 wherein said electrical equipment comprises a contactor having a base section, a middle section, and an upper section and said shield is slidably attached to rails protruding from a side of said middle section so that said conductors prevent removal of said shield from said contactor after said contactor is assembled and said shield is attached to said contactor.

11. The apparatus as in claim 1 wherein said at least one rail is two rails and said at least one groove is two grooves, and a first of said at least one rail matingly fits into a first of said at least one groove, and a second of said at least one rail matingly fits with a second of said at least one groove.

12. The apparatus as in claim 1 wherein said at least one rail has a triangular cross section.

13. A contactor having conductors capable of being connected to a voltage source, comprising:
 a shield made of nonconductive material and guarding said conductors on at least three sides;
 a cover attached to said shield by a living hinge so that when said cover is closed said conductors are not accessible from a fourth side, and when said cover is open said conductors are accessible from said fourth side;
 at least one rail extending from at least one side of said contactor;
 at least one groove made into said shield, said groove having an internal cross section for interlocking with said rail, so that said shield may be attached to said contactor by sliding said at least one groove over said at least one rail;
 said contactor having an upper section, a middle section, and a base attached to said middle section, and said conductors enter said contactor between said upper section and said middle section, and said at least one rail is molded into said middle section, and said shield may slidably engage said at least one rail and slide into position before assembly of said conductors between said upper section and said middle section, and said shield is captured to said middle section by said conductors preventing said shield from sliding along said at least one rail.

14. The apparatus as in claim 13 wherein said conductors comprise three terminals for use with three phase alternating current.

15. A contactor having conductors capable of being connected to a voltage source, comprising:
 a shield made of nonconductive material and guarding said conductors on at least three sides;
 a cover attached to said shield by a living hinge so that when said cover is closed said conductors are not accessible from a fourth side, and when said cover is open said conductors are accessible from said fourth side;
 at least one rail extending from at least one side of said contactor;
 at least one groove made into said shield, said groove having an internal cross section for interlocking with said rail, so that said shield may be attached to said contactor by sliding said at least one groove over said at least one rail;
 at least one protrusion extending from said at least one side of said contactor and capable of locking against said shield as said shield slides along said at least one rail in order to lock said shield in place on said at least one rail; and
 said contactor having an upper section, a middle section and a base attached to said middle section, and said conductors enter said contactor between said upper section and said middle section, and said at least one rail is molded into said upper section, and said shield may slidably engage said at least one rail and slide into guarding position about said conductors after assembly of said upper section, said middle section, said conductors between said upper section and said middle section, and attachment of said middle section to said base.

16. The apparatus as in claim 15 wherein said conductors comprise three terminals for use with three phase alternating current.

* * * * *